(12) United States Patent
Wittebrood et al.

(10) Patent No.: US 7,078,111 B2
(45) Date of Patent: *Jul. 18, 2006

(54) BRAZING SHEET PRODUCT AND METHOD OF ITS MANUFACTURE

(75) Inventors: Adrianus Jacobus Wittebrood, Velserbroek (NL); Jacques Hubert Olga Joseph Wijenberg, Amsterdam (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 116 days.

This patent is subject to a terminal disclaimer.

(21) Appl. No.: 10/732,448

(22) Filed: Dec. 11, 2003

(65) Prior Publication Data

US 2004/0131879 A1 Jul. 8, 2004

Related U.S. Application Data

(63) Continuation-in-part of application No. 10/622,122, filed on Jul. 18, 2003.

(60) Provisional application No. 60/443,865, filed on Jan. 31, 2003.

(30) Foreign Application Priority Data

Dec. 13, 2002 (EP) .................... 02027896

(51) Int. Cl.
 - B32B 15/20 (2006.01)
 - B32B 15/18 (2006.01)
 - B32B 15/01 (2006.01)
 - B23K 35/24 (2006.01)
 - C23C 10/00 (2006.01)

(52) U.S. Cl. ............ 428/653; 428/654; 428/656; 148/516; 148/518; 148/528; 148/530; 148/531; 148/533

(58) Field of Classification Search ............ 428/653, 428/648, 654, 656, 659, 926, 935, 936, 937, 428/938; 148/516, 518, 528, 530, 531, 533

See application file for complete search history.

(56) References Cited

U.S. PATENT DOCUMENTS 2,745,799 A    5/1956   Patrie (Continued)

FOREIGN PATENT DOCUMENTS

CH             655134    12/1983

(Continued)

OTHER PUBLICATIONS

ASTM G-85 (1990), no month given.

(Continued)

*Primary Examiner*—Jennifer C. McNeil
*Assistant Examiner*—Jason L. Savage
(74) *Attorney, Agent, or Firm*—Stevens, Davis, Miller Mosher LLP

(57) ABSTRACT

Disclosed is a brazing sheet product including a core metal sheet (1), on at least one side of the core metal sheet (1) a clad layer (2) made of an aluminium brazing alloy comprising silicon in an amount in the range of 4 to 14% by weight, and on at least one outersurface of the clad layer (2) a layer comprising iron or iron alloy (4), and on the outersurface of the layer comprising iron or iron alloy (4) a further layer (3) including a metal X, whereby X is selected from the group consisting of tin, zinc, bismuth, indium, antimony, strontium, titanium, manganese, copper, or combinations of two or more thereof. Also, disclosed is a method of manufacturing such a brazing product, and a brazed assembly including at least one component made of this brazing product.

71 Claims, 1 Drawing Sheet

U.S. PATENT DOCUMENTS

| | | |
|---|---|---|
| 2,821,014 A | 1/1958 | Miller |
| 2,821,505 A | 1/1958 | Beach |
| 3,482,305 A | 12/1969 | Dockus et al. |
| 3,489,657 A | 1/1970 | Brenan et al. |
| 3,597,658 A | 8/1971 | Rivera |
| 3,692,583 A | 9/1972 | Mucenieks et al. |
| 3,862,018 A | 1/1975 | Mentone |
| 3,881,999 A | 5/1975 | Toth et al. |
| 3,896,009 A | 7/1975 | Kobayashi et al. |
| 3,963,454 A | 6/1976 | Singleton, Jr. |
| 3,970,237 A | 7/1976 | Dockus |
| 4,028,200 A | 6/1977 | Dockus |
| 4,039,298 A | 8/1977 | Anthony et al. |
| 4,097,342 A | 6/1978 | Cooke et al. |
| 4,098,957 A | 7/1978 | Vernam et al. |
| 4,126,522 A | 11/1978 | Edlund |
| 4,157,154 A | 6/1979 | Scott et al. |
| 4,164,454 A | 8/1979 | Schober |
| 4,177,325 A | 12/1979 | Roberts et al. |
| 4,346,128 A | 8/1982 | Loch |
| 4,388,159 A | 6/1983 | Dockus et al. |
| 4,397,721 A | 8/1983 | Exalto et al. |
| 4,602,731 A | 7/1986 | Dockus |
| 4,721,653 A | 1/1988 | Oda et al. |
| 4,741,811 A | 5/1988 | Lefebvre et al. |
| 5,069,980 A | 12/1991 | Namba et al. |
| 5,234,574 A | 8/1993 | Tsuji et al. |
| 5,245,847 A | 9/1993 | Bando et al. |
| 5,246,565 A | 9/1993 | Mignardot |
| 5,422,191 A | 6/1995 | Childree |
| 5,466,360 A | 11/1995 | Ehrsam et al. |
| 5,601,695 A | 2/1997 | Muranushi |
| 5,643,434 A | 7/1997 | Benmalek et al. |
| 5,961,853 A | 10/1999 | Thornton |
| 5,997,721 A | 12/1999 | Limbach et al. |
| 6,060,174 A | 5/2000 | Sabol et al. |
| 6,129,262 A | 10/2000 | Cooper et al. |
| 6,165,630 A | 12/2000 | Gehlhaar et al. |
| 6,379,818 B1 | 4/2002 | Mooij et al. |
| 6,383,661 B1 | 5/2002 | Wittebrood et al. |
| 6,391,476 B1 | 5/2002 | Wittebrood et al. |
| 6,503,640 B1 | 1/2003 | Wittebrood et al. |
| 6,568,584 B1 | 5/2003 | Wittebrood et al. |
| 6,599,645 B1 | 7/2003 | Wittebrood |
| 2002/0088717 A1 | 7/2002 | Wittebrood et al. |
| 2002/0175205 A1 | 11/2002 | Wittebrood et al. |
| 2003/0042146 A1 | 3/2003 | Wijenberg et al. |
| 2003/0064242 A1 | 4/2003 | Wittebrood et al. |
| 2003/0091856 A1 | 5/2003 | Wittebrood et al. |
| 2003/0098338 A1 | 5/2003 | Dockus et al. |
| 2003/0155409 A1 | 8/2003 | Dockus et al. |
| 2003/0189082 A1 | 10/2003 | Dockus et al. |
| 2003/0197050 A1 | 10/2003 | Graham et al. |

FOREIGN PATENT DOCUMENTS

| | | |
|---|---|---|
| DE | 3821073 | 1/1989 |
| EP | 0227261 | 7/1987 |
| EP | 795048 | 6/1996 |
| FR | 2354171 | 1/1978 |
| FR | 2617868 | 1/1989 |
| GB | 1176688 | 1/1970 |
| GB | 2000525 | 1/1979 |
| JP | 54013430 | 1/1979 |
| JP | 3285763 | 12/1991 |
| JP | 5106059 | 4/1993 |
| JP | 9310137 | 3/1998 |
| JP | 11097298 | 4/1999 |
| JP | 2000297338 | 10/2000 |
| WO | 9743467 | 11/1997 |
| WO | 0071781 | 11/2000 |
| WO | 0071784 | 11/2000 |
| WO | 0168312 | 9/2001 |
| WO | 0188226 | 11/2001 |
| WO | 0238326 | 5/2002 |
| WO | 02060639 | 8/2002 |
| WO | 02086197 | 10/2002 |
| WO | 03043777 | 5/2003 |
| WO | 03045618 | 6/2003 |
| WO | 03045619 | 6/2003 |

OTHER PUBLICATIONS

Wijenberg et al., filed Jul. 18, 2003, U.S. Appl. No. 10/621,601 (unpublished).

Wijenberg et al., filed Jul. 18, 2003, U.S. Appl. No. 10/622,122 (unpublished).

Bureau of Mines Technology, "Aluminium Soft-Soldering", 2301 N.T.I.S. Tech Notes (manufacturing), XP-002119816, 1985, Jan. No. 1G, Springfield, VA, pp. 12-13.

Wernick and Pinner, "The Surface Treatment and Finishing of Aluminium and its Alloys", $5^{th}$ edition, vol. 1, pp. 181-182 and pp. 191-203 (1988), no month given.

Wernick and Pinner, "The Surface Treatment and Finishing of Aluminium and its Alloys", $5^{th}$ edition, vol. 2, pp. 1006-1022 and pp. 1023-1071 (Ch. 14-15)(Nov. 1988).

SAE Paper No. 880446 by B.E. Cheadle and K.F. Dockus, "Inert Atmosphere Fluxless Brazing of Aluminum Heat Exchangers", ICE, Detroit, Michigan, pp. 1-11 (Feb. 29-Mar. 4, 1988).

Adrianus Jacobus Wittebrood, Jacques Hubert Olga Joseph Wijenberg, Joop Nicolaas Mooij, "Nickel-Plated Aluminum Brazing Sheet", Research Disclosure, No. 439, pp. 1946-1947 (Nov. 2000).

SAE Paper No. P-263 by Kent Schölin and Bo Mannerskog, "Corrosion Resistant Aluminium Radiator Materials for Vacuum and Controlled Atmosphere Brazing" pp. 75-82, 1993 Vehicle Thermal Management Systems Conference Proceedings, no month given.

Greef, N. et al, "The Hydrogen Evolution Reaction", Instrumental Methods in Electrochemistry, pp. 233-236 (1990), no month given.

U.S. Appl. No. 10/732,405, Wittebrood et al., filed Dec. 11, 2003 (unpublished).

Patent Abstracts of Japan, vol. 2000, No. 13 (Feb. 5, 2001).

Patent Abstracts of Japan, vol. 1998, No. 04 (Mar. 31, 1998).

Patent Abstracts of Japan, vol. 0161, No. 19 (M-1225)(Mar. 25, 1992).

BRAZING SHEET PRODUCT AND METHOD OF ITS MANUFACTURE

The present application claims priority under 35 USC 119 from U.S. provisional patent application Ser. No. 60/443,865, filed Jan. 31, 2003, and European patent application EP 02027896.6 filed Dec. 13, 2002, both of which are incorporated herein by reference in their entirety. Also, this application is a continuation-in-part of U.S. patent application Ser. No. 10/622,122, filed Jul. 18, 2003, now pending.

FIELD OF THE INVENTION

The invention relates to a brazing sheet product, comprising a metallic core having on at least one side of the core an aluminium clad layer being made of an aluminium alloy comprising silicon in an amount in the range of 4 to 14% by weight, and a further metal layer, wherein taken together the aluminium clad layer and all layers exterior thereto form a filler metal for a brazing operation. The invention also relates to a method of manufacturing such a brazing product, and to a brazed assembly comprising at least one component made of this brazing product.

DESCRIPTION OF THE RELATED ART

Metals, such as aluminium and aluminium alloys, can be joined by a wide variety of brazing and soldering processes. Brazing, by definition, employs a filler metal or alloy having a liquidus above 450° C. and below the solidus of the base metal. Brazing is distinguished from soldering by the melting point of the filler metal: a solder melts below 450° C. Soldering processes are not within the field of the present invention.

Brazing sheet products find wide applications in heat exchangers and other similar equipment. Conventional aluminium brazing sheet products have a core or base sheet, typically an aluminium alloy of the Aluminium Association ("AA")3xxx-series, having on at least one surface of the core sheet a cladding of an aluminium clad layer, the aluminium clad layer being made of an AA4xxx-series alloy comprising silicon in an amount in the range of 4 to 14% by weight, and preferably in the range of 7 to 14% by weight. The aluminium clad layer may be coupled to the core or base alloy in various ways known in the art, for example by means of roll bonding, cladding, explosive cladding, thermal spray-forming or semi-continuous or continuous casting processes.

Controlled Atmosphere Brazing ("CAB") and Vacuum Brazing ("VB") are the two main processes used for industrial scale aluminium brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the aluminium oxide layer present is mainly caused by the evaporation of magnesium from the clad alloy. The capital investment for suitable equipment is relatively high.

CAB requires an additional process step prior to brazing as compared to VB, since a brazing flux has to be applied prior to brazing. A brazing flux material for use in brazing aluminium alloys usually consists of mixtures of alkali earth chlorides and fluorides, sometimes containing aluminium fluoride or cryolite. CAB is essentially a continuous process in which, if the proper brazing flux is being used, high volumes of brazed assemblies can be manufactured. The brazing flux dissolves the oxide layer at brazing temperature allowing the clad alloy to flow properly. When the NOCOLOK flux material is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminium surface before brazing. The brazing flux material after drying, however, can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the known brazing flux application. Such a material can be supplied to a manufacturer of brazed assemblies and is ready to use directly after forming of the assembly parts. No additional brazing fluxing operations have to be carried out. Presently, only one process for fluxless brazing is used on an industrial scale. The material for this process can be for example standard brazing sheet made from an AA3xxx-series core alloy clad on one or both sides with a cladding of an AA4xxx-series alloy. Before the brazing sheet can be used the surface has to be modified in such a way that the naturally occurring aluminium oxide layer does not interfere during the brazing cycle. The method of achieving good brazing is to deposit a specific amount of nickel on the surface of the clad alloy. If properly applied, the nickel reacts, presumably exothermically, with the underlying aluminium.

Processes for nickel-plating in an alkaline solution of aluminium brazing sheet are known from each of U.S. Pat. Nos. 3,970,237, 4,028,200, and 4,164,454, all of which are incorporated herein by reference in their entireties. According to these documents, nickel or cobalt, or combinations thereof, are deposited in combination with lead. The lead addition is used to improve the wetteability of the aluminium clad alloy during the brazing cycle. An important characteristic of these plating processes is that the nickel is preferentially deposited on the silicon particles of the aluminium clad alloy. To obtain sufficient nickel for brazing, the surface of the aluminium clad alloy should contain a relatively large number of silicon particles to act as nuclei for the nickel deposition. It is believed that to obtain sufficient nucleation sites a part of the aluminium in which the silicon particles are embedded should be removed before pickling by chemical and/or mechanical pre-treatment. This is believed a necessary condition to obtain sufficient silicon coverage to serve as nuclei for the plating action of the brazing or clad alloy. On a microscopic scale the surface of the Si-containing cladding of the brazing sheet is covered with nickel-lead globules. However, the use of lead for the production of a suitable nickel and/or cobalt layer on brazing sheet has several disadvantages. The use of lead for manufacturing products, such as automotive products, is undesirable and it is envisaged that in the very near future there might possibly even be a ban on lead comprising products or products manufactured via one or more intermediate processing steps comprising lead or lead-based components.

The international application no. WO-00/71784, by J. N. Mooij et al. (corresponding to U.S. Pat. No. 6,379,818 incorporated herein by reference in its entirety) discloses a brazing sheet product in which there is provided a very thin bonding layer, preferably applied by plating, comprising zinc or tin between the AlSi-alloy clad layer and the nickel layer in order to improve the bonding of the applied nickel layer. The addition of lead to the nickel layer has been replaced by the addition of bismuth while maintaining the excellent brazeability characteristics of the brazing sheet product.

A drawback of the known brazing sheet products having a layer comprising nickel is the limited corrosion life of brazed products in a SWAAT-test in accordance with ASTM G-85. Corrosion lifetimes without perforations are typically in the range of 4 to 6 days when having an AA3003-series core alloy and thereby restricting possible interesting applications of the brazing sheet product. For several applications, however, of the known nickel-plated brazing sheet in brazed products such a relatively short corrosion lifetime is not detrimental. A good corrosion resistance is considered a valuable property for brazing products used in amongst others heat exchangers, such as radiators and condensers. According to the international application WO-02/060639, by A. J. Wittebrood et al., the corrosion performance of Ni-plated brazing sheet products can be improved considerably by the addition of selected alloying elements, in particular dedicated amounts of tin.

SUMMARY OF THE INVENTION

It is an object of the present invention to provide a brazing sheet product for use in a brazing operation, ideally a fluxless CAB brazing operation, and wherein the brazing sheet product has as compared to Ni-plated brazing sheet products an improved post-braze corrosion resistance when measured in a SWAAT-test in accordance with ASTM G-85.

It is a further object of the present invention to provide a method of manufacturing the brazing sheet product.

The present invention relates to a brazing sheet product comprising a core metal sheet (1), on at least one side of the core metal sheet (1) a clad layer (2) made of an aluminium brazing alloy comprising silicon in an amount in the range of 4 to 14% by weight, and on at least one outersurface of the clad layer (2) a layer comprising iron or iron alloy (4), and on the outersurface of the layer comprising iron or iron alloy (4) a further layer (3) comprising a metal X or alloy thereof, wherein X is selected from the group consisting of tin, zinc, bismuth, indium, antimony, strontium, titanium, manganese, copper, or combinations of two or more thereof. Thus, the layer comprising iron or iron alloy may have a different composition compared to the X-alloy layer because the presence of metal X is not mandatory in the iron or iron alloy layer. The invention also relates to a method of manufacturing such a brazing product, and to a brazed assembly comprising at least one component made of this brazing product.

DETAILED DESCRIPTION OF THE PREFERRED EMBODIMENTS

Figure 1:
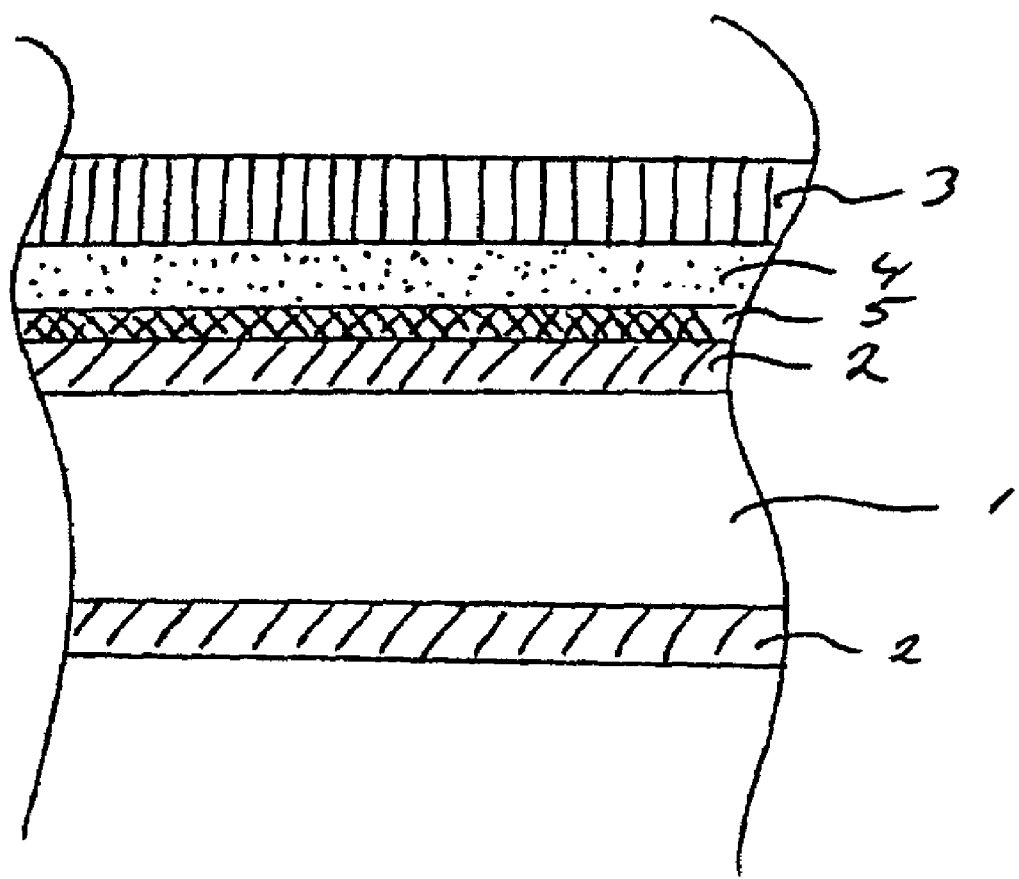
FIG. 1 represents a schematic longitudinal section showing the structure of a brazing sheet product in accordance with the invention, in this particular case the embodiment of a diffusion annealing treatment in accordance with the invention.

In accordance with the invention in one aspect there is provided a brazing sheet product that comprises a core metal sheet (1), on at least one side of the core metal sheet (1) a clad layer (2) made of an aluminium brazing alloy comprising silicon in an amount in the range of 4 to 14% by weight, and on at least one outersurface of the clad layer (2) a further layer comprising iron or iron alloy (4), and on the outersurface of the layer comprising iron or iron alloy (4) a further layer (3) comprising a metal X or alloy thereof, wherein X is selected from the group consisting of tin, zinc, bismuth, indium, antimony, strontium, titanium, manganese, copper, or combinations of two or more thereof.

Preferably the layer comprising iron or iron alloy comprises at least 80 weight percent iron, more preferably at least 85 weight percent iron, still more preferably at least 90 weight percent iron, and most preferably at least 96 weight percent iron or at least 98 weight percent iron. In the present specification all percentages are weight percents unless otherwise indicated.

The iron or iron alloy has been found to initiate the exothermic reaction during brazing in the absence of a brazing flux material such as the known NOCOLOK flux. The applied layer of metal X or alloys thereof is used to prevent the oxidation of the underlaying iron or iron alloy layer. The metal X is selected such that it assists in reducing the surface tension of the molten filler metal during a brazing operation. Another advantage of the metal X is that it may improve on the post-braze corrosion performance of the brazing product, in particular when subjected to a SWAAT environment.

In the brazing sheet product according to the invention, and in particular those having an AA3xxx-series core aluminium alloy, post-braze SWAAT corrosion lifetimes without perforations according to ASTM G-85 exceed 21 days, and in the best examples exceed 26 days. The brazing sheet product can be fluxless brazed under controlled atmosphere conditions in the absence of a brazing flux material while achieving very good post-braze corrosion performance significantly enhancing the possibilities of application of the brazing sheet product.

In an embodiment the brazing sheet product comprises a core metal sheet having on at least one side of the core metal sheet a clad layer made of an aluminium alloy containing silicon in an amount in the range of 4 to 14% by weight, and on at least one outersurface of the clad layer a layer comprising iron-X alloy, wherein X is selected from the group consisting of tin, zinc, bismuth, antimony, indium, strontium, manganese, titanium, copper, or combinations of two or more thereof. The selected metal X or alloys thereof lower the surface tension of the molten filler during a brazing operation and/or reduce the oxidation of the applied iron or iron alloy layer.

In an embodiment of the product according to the invention the layer comprising iron-X alloy and/or the layer comprising iron or iron alloy is formed by a plating method, for example an electrolytic plating method. However, other techniques such as roll bonding, thermal dipping, thermal spraying, Chemical Vapour Deposition ("CVD") and Physical Vapour Deposition ("PVD") or other techniques for depositing of metals or metal alloys from a gas or vapour phase may be used.

In an embodiment of the product according to the invention the layer comprising iron-X alloy is a diffusion layer.

Preferably each of the applied layers, e.g. the iron or iron alloy layer and metal X layer, are essentially (substantially) lead-free from an environmental point of view.

In an embodiment each of the applied layers, e.g. the iron or iron-alloy and metal-X layer are essentially nickel-free. In addition, the presence of nickel may have a detrimental influence on the post-braze corrosion performance of the brazing product.

In an embodiment the brazing sheet product according to the invention is further characterised by an optional thin layer as an intermediate bonding layer, preferably comprising zinc or tin, between the outer surface of the AlSi-alloy clad layer and the thin layer comprising iron or iron alloy. With the intermediate bonding layer, more preferably of zinc, a very effective bond between the AlSi-alloy clad layer and the thin layer comprising iron or iron alloy is formed, the bond remaining effective during subsequent deformation of the brazing product, for example in a bending operation. Preferably the intermediate bonding layer has a thickness of at most 0.5 μm, more preferably at most 0.3 μm, and most preferably in the range of 0.01 to 0.15 μm. In the best results obtained a thickness of about 20 to 30 nm has been used. It has been found that the thin bonding layer has no detrimental effect on the post-braze corrosion performance of the product according to the invention.

To form the intermediate bonding layer, techniques such as plating, electroplating, thermal dipping, thermal spraying, CVD and PVD or other techniques for depositing metals or metal alloys from a gas or vapour phase may be used.

In an embodiment of the brazing sheet product according to the invention, the clad layer and all layers exterior thereto form a metal filler for a brazing operation and having a composition with the proviso that the mol-ratio of Fe:sum of X (thus as a single element or the sum of all elements from that group) is such that there is sufficient unalloyed iron left to initiate the presumed exothermic reaction during the brazing cycle, and is preferably in the range of 10:(0.3 to 6), and more preferably in the range of 10:(0.5 to <5).

The core metal sheet can be of aluminium alloy, steel, aluminised steel, stainless steel, plated or coated stainless steel, bronze, brass, nickel, nickel alloy, titanium, or plated or coated titanium.

In an embodiment of the brazing sheet product the core metal sheet is an aluminium alloy, and is preferably selected from the group consisting of AA3xxx, AA5xxx, and AA6xxx-series aluminium alloy.

In an embodiment each AlSi-alloy clad layer has a thickness ranging from about 2 to 20% of the total thickness of the total brazing product thickness. Typical aluminium clad layer thickness is in the range of 40 to 80 micron. The aluminium core sheet has a thickness typically in a range of at most 5 mm, more preferably in the range of 0.1 to 2 mm.

In accordance with the invention in another aspect there is provided a method of manufacturing a brazing sheet, which method comprises the steps of (a) providing a core metal sheet having on at least one side of the core metal sheet a clad layer made of an aluminium alloy containing silicon in an amount in the range of 4 to 14% by weight, (b) applying a metal layer comprising iron or iron-alloy onto at least one outersurface of the aluminium substrate, (c) applying a metal layer comprising X or X-alloy onto the outersurface of the layer comprising iron or iron-alloy and wherein X is selected from the group consisting of tin, zinc, bismuth, antimony, strontium, titanium, copper, or combinations of two or more thereof, and subjecting the coated brazing product to a diffusion annealing treatment by holding the coated brazing product at a temperature in the range of 100 to 500° C. for a period of 1 sec. to 300 minutes to form on the outersurface of the aluminium base substrate and onto the iron or iron-alloy layer a diffusion layer comprising iron-X alloy.

Preferably the layer comprising iron or iron alloy comprises at least 80 weight percent iron, more preferably at least 85 weight percent iron, still more preferably at least 90 weight percent iron and most preferably at least 96 weight percent iron or at least 98 weight percent iron.

The annealing treatment achieves the effect that the applied metal X layer diffuses into the applied iron or iron alloy layer to form a Fe—X alloy layer. It is believed that an upper layer of iron metal is sensitive to oxidation. The surface iron-oxides formed might adversely influence the brazing process and/or any forming operation of the brazing sheet product prior to brazing. It has been found that a Fe—X alloy layer forms a thin stable surface oxide film in air. Further oxidation in air takes essentially place only at temperatures above about 300° C., which is significantly above any storage or handling temperature prior to a brazing operation.

During the diffusion annealing treatment the applied metal X diffuses from above into the plated iron or iron-alloy layer, thereby leaving considerable parts of the underlying iron or iron-alloy layer unalloyed by applied metal X. Such an unalloyed iron layer, or at least not alloyed with the applied metal X, is preferred since it is believed that it is of assistance to initiate the reaction, presumably exothermic, with the underlying AlSi-alloy during any brazing operation. The diffusion annealed iron-X alloy layer has typically a thickness in the range of about 0.1 to 0.8 μm.

In the embodiment where the metal X is tin or tin alloy, e.g. Sn—Bi alloy having less than 4% of Bi, it has been found that that an upper layer of pure tin metal is sensitive to progressive oxidation in pre-braze conditions under humid conditions. The surface oxides formed might adversely influence the brazing process. By providing the tin in the form of an iron-tin diffusion layer essentially no free tin is available anymore and thereby is avoided the occurrence of the detrimental progressive oxidation of the tin. It has been found that a Fe—Sn alloy diffusion layer forms a thin stable surface oxide film in air. Further oxidation in air takes essentially place only at temperatures above about 320° C.

The melting point of tin is about 232° C. The diffusion annealing treatment may be carried out below the melting temperature of tin, but requiring prolonged soaking time up to 300 minutes. The diffusion annealing treatment may be carried out also above the melting temperature of tin, for example at about 250° C. or about 300° C., whereby the tin diffuses into the solid iron or iron-alloy layer. Preferred diffusion annealing treatments for tin are at a temperature in a range of 230 to 350° C. for a soaking time of 1 sec. to 600 sec., and more preferably 1 sec. to 300 sec.

In an embodiment the layer comprising iron or iron alloy is applied using an electrolytic plating method. However, as stated above, other techniques may be employed.

In an embodiment the metal layer comprising X is applied using an electrolytic plating method. However, as stated above, other techniques may be employed.

In an embodiment of the method according to the invention the diffusion annealing treatment is preferably carried out in a protective environment preventing the oxidation of the metal X, such as tin or tin-alloy, such as a nitrogen gas atmosphere or an $HN_x$-atmosphere or argon gas atmosphere or combinations thereof.

In an embodiment taken together the aluminium clad layer and all layers exterior thereto form a metal filler for a brazing operation and together has a composition comprising at least, by weight percent:

Si in the range of 5 to 14%,

Fe in the range of 0.15 to 8%, preferably 0.9 to 5%,
X in the range of 0.01 to 7%, preferably 0.35 to 2%, and
   wherein X is selected from the group consisting of Sn, Zn, Bi, In, Sb, Sr, Ti, Mn, and Cu.
Sn in the range of 0.0 to 0.3% if not present as X,
Bi in the range of 0.0 to 0.3% if not present as X,
In in the range of 0.0 to 0.3% if not present as X,
Sb in the range of 0.0 to 0.3% if not present as X,
Zn in the range of 0.0 to 0.3% if not present as X,
Sr in the range of 0.0 to 0.1% if not present as X,
Ti in the range of 0.0 to 0.1% if not present as X,
Mn in the range of 0.0 to 0.3% if not present as X,
Cu in the range of 0.0 to 0.3% if not present as X,
Mg in the range of 0.0 to 5%,
balance aluminium and inevitable impurities, and with the proviso that the mol-ratio of Fe:sum of X is in the range of 10:(0.3 to 6), and preferably in the range of 10:(0.5 to <5).

In an embodiment of the product according to the invention the layer comprising iron-X alloy is a diffusion layer.

The AlSi clad layer may optionally contain bismuth and/or antimony as an alloying element in a range of up to 1% by weight to lower also the surface tension of the molten filler metal during a brazing operation. Other alloying elements may be present in the filler, and will typically originate from the AlSi clad layer. Typically each impurity element is present in a range of not more than 0.05%, and the total of the impurity elements does not exceed 0.3%.

Preferably in the brazing product obtained by the method according to the invention the applied layer comprising iron or iron alloy, e.g. Fe—Bi, having 80% or more of iron (or 85 weight % or more of iron, or 90 weight % or more of iron, or 96 weight % or more of iron or 98 weight % or more of iron) has a thickness of at most 2.0 µm, preferably at most 1.0 µm, and more preferably in the range of 0.05 to 0.5 µm. A coating thickness of more than 2.0 µm requires a prolonged treatment time for plating, and may result in wrinkling of the molten filler metal during a subsequent brazing operation. A preferred minimum thickness for this iron containing layer is about 0.101 µm. Preferably the iron or iron alloy comprising layer is essentially (substantially) lead-free.

In an embodiment the method according to the invention is further characterised by depositing a thin layer, preferably comprising zinc or tin, as an intermediate bonding layer between the outer surface of the AlSi-alloy layer and the layer comprising iron or iron-alloy. With this intermediate bonding layer a very effective bond between the AlSi-alloy layer and the thin layer comprising iron or iron-alloy is formed, the bond remaining effective during subsequent deformation of the brazing sheet product, for example in a bending operation. The most suitable methods of applying such an intermediate layer of zinc is by means of direct or immersion plating. Preferably the applied intermediate bonding layer has a thickness of at most 0.5 µm, more preferably at most 0.3 µm, and most preferably in the range of 0.01 to 0.15 µm. In the best results obtained a thickness of about 30 nm has been used. A coating thickness of more than 0.5 µm is thought to have no further advantages for improving the adhesion.

The applied thin bonding layer could be attacked in a subsequent iron plating operation. Prevention, or at least minimization of the dissolution of this bonding layer can be achieved for example by maintaining the pH of the plating bath for the application of the iron or iron-alloy in a range of 3 to 12, and more preferably in a range of 6 to 11.

Alternative, or in combination, a very thin further coating could be applied on the bonding layer, such as a Ni flash, prior to applying the iron layer.

The invention further provides an assembly of components, for example a heat exchanger, typically for automotive applications, or a fuel cell, typically an electrochemical fuel cell, joined by brazing, wherein at least one of the components is a brazing sheet product as set out above or the brazing product obtained by the method set out above. The brazing operation is preferably carried out in an inert atmosphere (CAB) in the absence of a brazing flux material or under a vacuum.

In an embodiment there is provided a brazed assembly wherein at least one of the components to be joined by brazing is made of the brazing sheet product set out above or produced by the method in accordance with the invention described above, and at least one other component is made of steel, aluminised steel, stainless steel, plated or coated stainless steel, bronze, brass, nickel, nickel alloy, titanium, or plated or coated titanium.

The invention will now be illustrated by a non-limitative example and with reference to the drawing, wherein:

FIG. 1 represents a schematic longitudinal section showing the structure of a brazing sheet product in accordance with the invention, in this particular case the embodiment of a diffusion annealing treatment in accordance with the invention. FIG. 1 shows schematically a brazing sheet product in accordance with the present invention consisting of a core sheet 1, e.g. an aluminium alloy core sheet, on one or both sides clad with an aluminium clad layer 2 comprising an Al—Si alloy and the iron-X alloy, for example iron-tin, diffusion layer 3 resulting from the diffusion annealing treatment of two separately applied metal layers of iron or iron alloy and tin or tin alloy, and the layer 4 comprising iron or iron alloy which has not been alloyed as a result of the diffusion annealing treatment, and the optional bonding layer 5 of zinc is applied, the advantages of which are set out above. In FIG. 1 the layers 3, 4 and 5 have been shown on only one side of the brazing sheet, but it will be immediately apparent to the skilled person that they may also be applied on both sides of the brazing sheet product. Thus, if desired, the clad layer 2 shown to only contact the core 1, may be further provided with other layers, e.g. 3 and 4, and optionally also with 5.

EXAMPLE

On a laboratory scale tests were carried out on aluminium brazing sheets manufactured from an AA3003 core alloy roll clad on both sides with an AA4045 clad alloy, and having a total thickness of 0.5 mm and a clad layer thickness of 50 microns on both sides. The following sequential pre-treatment steps have been used for each sample:

cleaning by immersion for 180 sec. at 50° C. in ChemTec 30014 (a commercially available bath), followed by rinsing, alkaline etching for 20 sec. at 50° C. in ChemTec 30203 (a commercially available bath), followed by rinsing, desmutting for 60 sec. at room temperature in an acidic oxidising solution, typically 50% nitric acid, followed by rinsing, zincate immersion using ChemTec 19023 (a commercially available zincate bath) for 60 sec. at room temperature resulting in a thin zinc bonding layer having a thickness of about 30 nm, followed by rinsing.

Following the above pre-treatment on both sides firstly an iron layer 1.3, 3.0 and 4.0 g/m² was applied by means of electroplating, and on top of the applied iron layer a tin layer was applied also by means of electroplating of various thickness of 0.27, 0.55, 0.64 0.85, 1.2 or 1.7 g/m² (see Table 1).

The composition of the (ammonium sulphate) iron-plating bath was:

215 g/l FeSO$_4$.7H$_2$O
104 g/l (NH$_4$)$_2$SO$_4$
pH 4.5

The plating bath for applying an iron layer is preferably essentially nickel-free. Furthermore, iron salt as compared to nickel salt are relatively inexpensive and are non-toxic.

The tin plating bath was a commercial available Methane Sulfonic Acid ("MSA") bath called RONASTAN (trademark) supplied by Shipley Ronal, and having the composition:

| | |
|---|---|
| 25 g/l | Sn |
| 60 g/l | MSA |
| 3.5 g/l | sulphuric acid |
| 45 ml/l | additive TP |
| 4.5 ml/l | anti-oxidant TP |

Following the plating of the metal layers, the plated brazing sheet product was diffusion annealed for 1 minute at 250° C. under a protective inert nitrogen atmosphere to form a Fe—Sn diffusion layer. It would also be possible to obtain a diffusion alloy layer during the heat-up of a brazing cycle, optionally by maintaining the brazing product for a short period of time in a predetermined temperature range, e.g. 200 to 300° C. The resultant diffusion annealed panels looked silvery and shiny. An advantage of such a diffusion layer is that it reduces undesirable oxidation of the iron layer. Another advantage of such a diffusion layer is that it reduces the progressive oxidation of the applied tin layer. Samples of the diffusion-annealed products were analysed by Glow Discharge Optical Emission Spectroscopy ("GDOES"). The GDOES depth profiles showed that the tin was completely alloyed with the iron after the diffusion annealing treatment. There was no free tin present anymore. The resulting Fe—Sn alloy diffusion layer was mainly composed of the equilibrium phase FeSn$_2$. Underneath the Fe—Sn alloy diffusion layer there was a tin-free iron layer having the composition of the originally plated iron layer prior to the diffusion annealing treatment and had not been alloyed with the tin as result of the diffusion annealing treatment. During the diffusion annealing and for the amounts of iron and tin applied, only about 10% of the total amount of iron reacted with the tin. This unalloyed iron is presumed to be required to initiate the exothermic reaction during the brazing operation.

The plated specimens have been tested for adhesion using the Erichsen dome test (5 mm), and the T-bend test. A value assessment is then given to the adhesion of poor, fair, or good. All samples tested had a good adhesion performance.

For the assessment of the post-braze corrosion resistance, the samples have been subjected to a simulated brazing cycle. The samples were heated under flowing nitrogen, with heating from room temperature to 580° C., dwell time at 580° C. for 2 minutes, cooling from 580° C. to room temperature. All samples had a good brazeability. Following the brazing cycle four samples of each type of plated brazing sheet have been tested in a SWAAT until the first perforations expressed in days of testing appear according to ASTM G-85, and the individual results are given in Table 1. The dimensions of the samples for the SWAAT-test were 100 m×50 mm.

As a reference it is mentioned that typically aluminium brazing sheets manufactured from an AA3003 core alloy clad on both sides with an AA4045 clad alloy, and having a total thickness of 0.5 mm and a clad layer thickness of 50 microns each, similar as used above, and devoid of any further metal layers and being brazed using a NOCOLOK brazing flux material have a SWAAT-test performance in a range of 13 to 19 days without perforations.

As a further reference material also brazing sheet product (same core and clad layer composition and thickness) with a thin zinc bonding layer and only a NiBi-alloy electroplated layer manufactured according to the example of the international PCT application no. WO-01/88226, by J. N. Mooij et al., has been tested for its corrosion performance. The measured average over 4 samples was 4 days without perforations.

As yet further reference material also brazing sheet product (same core and clad layer composition and thickness) with a thin zinc bonding layer and only a NiSn-alloy electroplated layer manufactured according to the example of the international PCT application no. WO-02/060639, by J. A. Wittebrood et al., has been tested for its corrosion performance. The applied amount of tin was 1.8 g/m² and the mol-ratio of Ni:Sn was 10:2. The measured average over 4 samples was 8 days without perforations.

TABLE 1

Post-braze SWAAT-test results.

| Sample | Applied Fe-coating (g/m²) | Applied Sn-coating (g/m²) | Brazeability | SWAAT-test performance (days) |
|---|---|---|---|---|
| 1 | 1.3 | 0.27 | fair | not tested |
| 2 | 1.3 | 0.55 | fair | not tested |
| 3 | 3.0 | 0.64 | good | not tested |
| 4 | 3.0 | 1.3 | good | 28 |
| 5 | 4.0 | 0.85 | good | not tested |
| 6 | 4.0 | 1.7 | good | 31 |

The overall composition of the filler metal of sample no. 6 has been measured, and was, in weight percent:

| | |
|---|---|
| Si | 11.47 |
| Zn | 0.16 |
| Fe | 3.3 |
| Sn | 1.27 |
| Al | 83.8 (balance) |

From the results of Table 1 it can be seen that the brazing sheet product according to the invention can be readily brazed in the absence of a brazing flux material, while be manufactured from simple plating bath compositions. Furthermore, it can be seen that in comparison with the Ni-plated brazing sheet products according to the prior art, that the brazing sheet product according to the invention has a very good corrosion performance when subjected to a SWAAT-test. The SWAAT-test performance is even significantly better than conventional material being brazed using the NOCOLOK flux material. All products tested had the same AA3003-series core alloy.

Having now fully described the invention, it will be apparent to one of ordinary skill in the art that many changes and modifications can be made without departing from the spirit or scope of the invention as hereon described.

The invention claimed is:

1. A brazing sheet product comprising a core metal sheet (1), on at least one side of said core metal sheet (1) a clad layer (2) made of an aluminium brazing alloy comprising silicon in an amount in the range of 4 to 14% by weight, and on at least one outersurface of said clad layer (2) a layer comprising iron or iron alloy (4), and on the outersurface of said layer comprising iron or iron alloy (4) a further layer (3) comprising a metal X, whereby X is selected from the group consisting of tin, zinc, bismuth, indium, antimony, strontium, titanium, manganese, copper, or combinations of two or more thereof.

2. A brazing sheet product according to claim 1, wherein the further layer comprises an iron-X alloy, wherein X is selected from the group consisting of tin, zinc, bismuth, indium, antimony, strontium, titanium, copper, or combinations of two or more thereof.

3. A brazing sheet product according to claim 2, wherein the layer comprising iron-X alloy is formed by a plating method.

4. A brazing sheet product according to claim 2, wherein the layer comprising iron-X alloy is formed by an electrolytic plating method.

5. A brazing sheet product according to claim 2, wherein the layer comprising iron-X alloy is a diffusion layer.

6. A brazing sheet product according to claim 5, wherein the iron-X alloy diffusion layer has a thickness in the range of about 0.1 to 0.8 µm.

7. A brazing sheet product according to claim 1, wherein there is a bonding layer between said outer surface of said clad layer and said layer comprising iron or iron alloy.

8. A brazing sheet product according to claim 1, wherein there is a layer comprising zinc or tin as a bonding layer between said outer surface of said clad layer and said layer comprising iron or iron alloy.

9. A brazing sheet product according to claim 7, wherein said bonding layer has a thickness of at most 0.5 micron.

10. A brazing sheet product according to claim 7, wherein said bonding layer has a thickness of at most 0.3 µm.

11. A brazing sheet product according to claim 7, wherein said bonding layer has a thickness in the range of 0.01 to 0.15 µm.

12. A brazing sheet product according to claim 1, wherein the clad layer and all layers exterior thereto form a metal filler for a brazing operation and have a composition with the proviso that the mol-ratio of Fe:sum of X is in the range of 10:(0.3 to 6).

13. A brazing sheet product according to claim 1, wherein the mol-ratio of Fe:sum of X is in the range of 10:(0.5 to <5).

14. A brazing sheet product according to claim 1, wherein the core metal sheet comprises a member of the group consisting of aluminium alloy, steel, aluminised steel, stainless steel, plated or coated stainless steel, bronze, brass, nickel, nickel alloy, titanium, and plated or coated titanium.

15. A brazing sheet product according to claim 1, wherein the core metal sheet comprises aluminium alloy.

16. A brazing sheet product according to claim 1, wherein the core metal sheet comprises an aluminium alloy selected from the group consisting of AA3xxx, AA5xxx, and AA6xxx-series aluminium alloy.

17. A brazing sheet product according to claim 1, wherein the metal X layer is substantially lead-free.

18. A brazing sheet product according to claim 1, wherein the layer comprising iron or iron alloy comprises at least 80 weight percent iron.

19. A brazing sheet product according to claim 1, wherein the layer comprising iron or iron alloy comprises at least 85 weight percent iron.

20. A brazing sheet product according to claim 1, wherein the layer comprising iron or iron alloy comprises at least 90 weight percent iron.

21. A brazing sheet product according to claim 1, wherein the layer comprising iron or iron alloy comprises at least 96 weight percent iron.

22. A brazing sheet product according to claim 1, wherein the layer comprising iron or iron alloy comprises at least 98 weight percent iron.

23. A brazing sheet product according to claim 1, wherein the layer comprising iron or iron alloy has a thickness of at most 2.0 µm.

24. A brazing sheet product according to claim 1, wherein the layer comprising iron or iron alloy has a thickness of at most 1.0 µm.

25. A brazing sheet product according to claim 1, wherein the layer comprising iron or iron alloy has a thickness in the range of 0.05 to 0.5 µm.

26. An assembly of components joined by brazing, at least one said components being a brazing sheet product according to claim 1.

27. An assembly according to claim 26, wherein the assembly is brazed under a vacuum or in an inert atmosphere in the absence of a brazing-flux material.

28. An assembly according to claim 26, wherein the assembly is a heat exchanger.

29. An assembly according to claim 26, wherein the assembly is a fuel cell.

30. An assembly according to claim 26, wherein the assembly is an electrochemical fuel cell.

31. A method of manufacturing a brazing product according to claim 1, comprising the steps of: (a) providing a core metal sheet having on at least one side of said core metal sheet a clad layer made of an aluminium alloy containing silicon in an amount in the range of 4 to 14% by weight, (b) applying a metal layer comprising iron or iron-alloy onto at least one outersurface of said aluminium substrate, (c) applying a metal layer comprising X onto the outersurface of layer comprising iron or iron-alloy and wherein X is selected from the group consisting of tin, zinc, bismuth, antimony, strontium, indium, titanium, manganese, copper, or combinations of two or more thereof, and (d) subjecting the coated brazing product to a diffusion annealing treatment to form on the outer surface of said aluminium base substrate and onto the iron or iron-alloy layer a diffusion layer comprising iron-X alloy.

32. A method according to claim 31, wherein the diffusion annealing treatment comprises holding the coated brazing product at a temperature in the range of 100 to 500° C. for a period of up to 300 minutes.

33. A method according to claim 31, wherein the diffusion annealing treatment comprises holding the coated brazing product at a temperature in the range of 100 to 500° C. for a period of 1 sec. to 300 minutes.

34. A method according to claim 31, wherein the metal X is tin or tin alloy and the diffusion annealing treatment is carried out below the melting temperature of tin.

35. A method according to claim 31, wherein the metal X is tin or tin alloy and the diffusion annealing treatment is carried out above the melting temperature of tin.

36. A method according to claim 31, wherein the metal X is tin or tin alloy and the diffusion annealing treatment is carried out at about 250° C. or about 300° C., whereby the tin diffuses into the solid iron or iron-alloy layer.

37. A method according to claim 31, wherein the diffusion annealing treatment is at a temperature in a range of 230 to 350° C. for a soaking time of 1 sec. to 600 sec.

38. A method according to claim 31, wherein the diffusion annealing treatment is at a temperature in a range of 230 to 350° C. for a soaking time of 1 sec. to 300 sec.

39. A method according to claim 31, wherein the layer comprising iron or iron-alloy is applied using a plating method.

40. A method according to claim 31, wherein the layer comprising iron or iron-alloy is applied using an electrolytic plating method.

41. A method according to claim 31, wherein the metal layer comprising X is applied using a plating method.

42. A method according to claim 31, wherein the metal layer comprising X is applied using an electrolytic plating method.

43. A method according to claim 31, wherein the metal layer comprising iron or iron alloy is applied using a PVD method.

44. A method according to claim 31, wherein the metal layer comprising X is applied using a PVD method.

45. A method according to claim 31, wherein the metal layer comprising iron or iron alloy is applied using thermal spraying.

46. A method according to claim 31, wherein the metal layer comprising X is applied using thermal spraying.

47. A method according to claim 31, wherein the diffusion annealing treatment is carried out in a protective atmosphere.

48. A method according to claim 31, wherein the core metal sheet comprises a member of the group consisting of aluminium alloy, steel, aluminised steel, stainless steel, plated or coated stainless steel, bronze, brass, nickel, nickel alloy, titanium, and plated or coated titanium.

49. A method according to claim 31, wherein the core metal sheet comprises aluminium alloy.

50. A method according to claim 31, wherein the core metal sheet comprises an aluminium alloy selected from the group consisting of AA3xxx, AA5xxx, and AA6xxx-series aluminium alloy.

51. A method according to claim 31, wherein taken together the clad layer comprising silicon in an amount in the range of 4 to 14% by weight and all layers exterior thereto form a filler metal for a brazing operation and having a composition comprising at least, by weight percent:

Si in the range of 5 to 14%,
Fe in the range of 0.15 to 8%,
X in the range of 0.01 to 7%, and wherein X is selected from the group consisting of Sn, Zn, Bi, In, Sb, Sr, Mn, Ti, and Cu or combinations of two or more thereof,
Sn in the range of 0.0 to 0.3% if not present as X,
Bi in the range of 0.0 to 0.3% if not present as X,
Sb in the range of 0.0 to 0.3% if not present as X,
In in the range of 0.0 to 0.3% if not present as X,
Zn in the range of 0.0 to 0.3% if not present as X,
Sr in the range of 0.0 to 0.1% if not present as X,
Mn in the range of 0.0 to 0.3% if not present as X,
Ti in the range of 0.0 to 0.1% if not present as X,
Cu in the range of 0.0 to 0.3% if not present as X,
Mg in the range of 0.0 to 5%,
balance aluminium and inevitable impurities.

52. A method according to claim 51, wherein the mol-ratio of Fe:sum of X is in the range of 10:(0.3 to 6).

53. A method according to claim 51, wherein the mol-ratio of Fe: sum of X is in the range of 10:(0.5 to <5).

54. A method according to claim 31, wherein prior to applying a coating according to step (b), there is deposited onto the outer surface of the clad layer a bonding layer having a thickness of not more than 0.5 micron.

55. A method according to claim 31, wherein prior to applying a coating according to step (b), there is deposited onto the outer surface of the clad layer a bonding layer comprising zinc or tin, said bonding layer having a thickness of at most 0.5 micron.

56. A method according to claim 55, wherein said bonding layer has a thickness of at most 0.3 μm.

57. A method according to claim 55, wherein said bonding layer has a thickness in the range of 0.01 to 0.15 μm.

58. A method according to claim 31, wherein the metal X layer is substantially lead-free.

59. A method according to claim 31, wherein the layer comprising iron or iron alloy comprises at least 80 weight percent iron.

60. A method according to claim 31, wherein the layer comprising iron or iron alloy comprises at least 85 weight percent iron.

61. A method according to claim 31, wherein the layer comprising iron or iron alloy comprises at least 90 weight percent iron.

62. A method according to claim 31, wherein the layer comprising iron or iron alloy comprises at least 96 weight percent iron.

63. A method according to claim 31, wherein the layer comprising iron or iron alloy comprises at least 98 weight percent iron.

64. A method according to claim 31, wherein the layer comprising iron or iron alloy has a thickness of at most 2.0 μm.

65. A method according to claim 31, wherein the layer comprising iron or iron alloy has a thickness of at most 1.0 μm.

66. A method according to claim 31, wherein the layer comprising iron or iron alloy has a thickness in the range of 0.05 to 0.5 μm.

67. A method according to claim 31, wherein X in the range of 0.35 to 2%.

68. A method according to claim 31, wherein Fe in the range of 0.9 to 5%.

69. A method according to claim 31, wherein the iron-X alloy diffusion layer has a thickness in the range of about 0.1 to 0.8 μm.

70. An assembly of components joined by brazing, at least one said components being a product obtained by the method according to claim 31.

71. An assembly according to claim 70, wherein the assembly is brazed under a vacuum or in an inert atmosphere in the absence of a brazing-flux material.

* * * * *